Reissued Jan. 2, 1940 Re. 21,311

UNITED STATES PATENT OFFICE 21,311

WATERPROOFING COMPOSITION AND METHOD OF WATERPROOFING FABRIC

John B. Cleaveland, Far Hills, N. J.

No Drawing. Original No. 2,046,305, dated June 30, 1936, Serial No. 714,267, March 6, 1934. Application for reissue June 29, 1938, Serial No. 216,631

10 Claims. (Cl. 91—68)

This invention relates to a new waterproofing composition for waterproofing fabrics and other materials and includes the new composition and the method of making it, as well as the method of waterproofing therewith.

In the waterproofing of fabrics, etc. with an insoluble soap, it has been proposed to use two successive treating solutions, one of which is a solution of a water soluble soap and the other a solution of a salt which will react with the water soluble soap to form an insoluble soap. This method of treatment requires two successive treatments and there is liable to be an excess of one of the reagents to be subsequently removed.

The present invention provides an improved aqueous composition which is used in a single treatment, with a single bath, followed by heating the treated fabric, etc. to bring about changes or reactions in the composition and the effective waterproofing of the material.

The invention will be illustrated by the following example:

Equal parts by weight of diglyco stearate and paraffin wax are melted together at a temperature of about 205° F. and uniformly mixed and blended, and boiling water is added thereto while at such temperature and with rapid agitation to effect a uniform distribution of the materials with the water. The water is added in the proportions of about fifteen gallons to about nine and three-quarters pounds of the melted mixture. The rapid agitation is continued until the hot liquid mixture is cool and there is then added about fifteen gallons of a solution of aluminum sulfate containing about seven and one-half pounds of aluminum sulfate. Reaction does not take place between the aluminum sulfate and the diglyco stearate at low temperatures and this emulsion can be further diluted, for example, with two to four parts of water added to one part of the emulsion, before it is used for waterproofing purposes.

In applying this aqueous composition to cloth, the cloth is saturated with the mixture and then subjected to moderate heat, for example, of about 150° F., which appears to bring about a reaction between the aluminum sulfate and the diglyco stearate with the resulting precipitation of aluminum stearate as an insoluble metal soap in the fibers of the cloth.

The emulsion can be made without the paraffin wax, but the presence of the paraffin wax is advantageous. It appears to have a protective action in protecting or retarding the action of the diglyco stearate with the aluminum sulfate, and it increases the permanence of the waterproofing effect.

Instead of paraffin wax, other suitable waxes can be used, such as ozocerite, beeswax, carnauba wax, montan wax, etc., but I consider paraffin wax more advantageous for use in the new composition.

Instead of using diglyco stearate, other diglyco fatty acid esters can be used, such as diglyco oleate, diglyco palmitate, or mixtures or mixed esters, etc. The products used in accordance with this invention are those sold as diglycol stearate, diglycol oleate, etc.

Instead of using aluminum sulfate, other metal salts can be used which form insoluble soaps such as lead acetate, aluminum acetate, zinc chloride, etc. Aluminum acetate is a particularly advantageous salt to use and it can readily be prepared by the reaction of solutions containing approximately equal amounts of aluminum sulfate and lead acetate. Aluminum acetate itself has waterproofing properties, particularly after it has been subjected to heating, and this action may supplement any formation of insoluble aluminum soap where an excess of the aluminum acetate is used, or where only part of the aluminum acetate used reacts to form the insoluble aluminum soap.

In making the new composition, apparatus should be used which is resistant to the chemical action of the ingredients, for example, Monel metal apparatus or earthenware apparatus.

In using the new composition, a single bath and a single treatment of the fabric or other material is sufficient. The aqueous emulsion is readily absorbed by the fabric or other material, and, when heated to a suitable temperature, undergoes reaction with resulting effective waterproofing of the fabric. I consider a composition in which diglyco stearate, paraffin and a soluble aluminum salt, such as aluminum acetate, are used, particularly advantageous since the combination of aluminum stearate, formed by the reaction, together with paraffin in intimate combination, gives excellent resistance against washing and dry cleaning of the treated fabric.

In the continuous waterproofing of fabric, the fabric is passed continuously through a bath of the composition and then over a heated roll or through a heated chamber to heat the fabric and the composition to bring about the desired reaction; or the composition is sprayed or flowed or otherwise applied to the fabric followed by heating, etc. The fabric, after heating, can be washed to remove soluble compounds, where this is desired, and can then be dried in a continuous manner by passing over a drying roll.

I claim:

1. A waterproofing composition comprising an aqueous emulsion of a diglyco ester of a higher fatty acid and a soluble salt of a metal which reacts with a higher fatty acid to form an insoluble soap.

2. A waterproofing composition comprising a wax and a diglyco ester of a higher fatty acid, intimately blended together and suspended in a finely divided state in water, which water contains dissolved therein a salt of a metal forming an insoluble soap.

3. A waterproofing composition comprising diglyco stearate, paraffin and a soluble salt of aluminum.

4. A waterproofing composition comprising diglyco stearate, paraffin and aluminum acetate, said composition being in the form of an aqueous emulsion.

5. The method of forming a waterproofing composition which comprises melting together a wax and a diglyco ester of a higher fatty acid, forming an emulsion of said mixture with water and adding thereto a soluble salt of a metal forming an insoluble soap.

6. The method of forming a waterproofing composition which comprises melting together paraffin wax and diglyco stearate, forming an emulsion with the resulting melted mixture and water and adding thereto a soluble salt of aluminum.

7. The method of waterproofing fabric, and other materials which comprises applying thereto an aqueous emulsion containing a diglyco ester of a higher fatty acid and a soluble metal salt forming an insoluble soap and heating the fabric to bring about reaction between the metal salt and the diglyco ester to form an insoluble soap.

8. The method of waterproofing fabric, and other materials which comprises applying thereto an aqueous emulsion containing paraffin wax and diglyco stearate intimately combined and distributed therein and also containing a soluble salt of aluminum, and heating the resulting fabric to bring about reaction between the aluminum salt and the diglyco stearate to form aluminum stearate.

9. Fabric and other materials waterproofed by a process which comprises applying thereto an aqueous emulsion containing a wax, a diglyco ester of a higher fatty acid and a soluble metal salt forming an insoluble soap, and heating the thus treated material to bring about reaction between the metal salt and the diglyco ester to form an insoluble soap.

10. Fabric and other materials waterproofed by a process which comprises applying thereto an aqueous emulsion containing paraffin wax, diglyco stearate and a soluble metal salt forming an insoluble soap, and heating the thus treated material to bring about reaction between the metal salt and the diglyco stearate to form an insoluble soap.

JOHN B. CLEAVELAND.